（12）United States Patent
Zhang

(10) Patent No.: US 6,291,972 B1
(45) Date of Patent: Sep. 18, 2001

(54) SYSTEM FOR BATTERY FORMATION, CHARGING, DISCHARGING, AND EQUALIZATION

(76) Inventor: Chaojiong Zhang, 4615 Valleybrook, College Station, TX (US) 77845

( * ) Notice: Subject to any disclaimer, the term of this patent is extended or adjusted under 35 U.S.C. 154(b) by 0 days.

(21) Appl. No.: 09/505,611

(22) Filed: Feb. 17, 2000

Related U.S. Application Data

(60) Provisional application No. 60/120,635, filed on Feb. 17, 1999.

(51) Int. Cl.[7] .................................................... H02J 7/00
(52) U.S. Cl. ........................................... 320/118; 320/116
(58) Field of Search .................................. 320/118, 116, 320/117, 119, 120, 125, 126, 127, 138; 429/97, 98, 99, 100

(56) References Cited

U.S. PATENT DOCUMENTS

| | | | |
|---|---|---|---|
| 5,631,101 | * | 5/2000 | Amero, Jr. ............................. 429/97 |
| 6,020,717 | * | 2/2000 | Kadouchi et al. ..................... 320/118 |
| 6,078,165 | * | 6/2000 | Ashtiani et al. ...................... 320/116 |
| 6,099,986 | * | 8/2000 | Gauthier et al. ...................... 429/120 |

* cited by examiner

*Primary Examiner*—Peter S. Wong
*Assistant Examiner*—Lawrence Luk
(74) *Attorney, Agent, or Firm*—Bracewell & Patterson, LLP

(57) ABSTRACT

A circuit assembly for the formation and charging of secondary batteries, such as lithium ion and lithium-polymer cells, is provided. A parallel arrangement of cells eliminates the need for current regulation for each, thereby providing a mechanism for self-equalization of the cells configured in this way. Cells in parallel are governed by the same voltage profile, and each cell draws current from a voltage-regulating channel according to its state of health. A holder is also provided for connecting cells to the electronic instrument containing the voltage-regulating channel. This holder provides for reliable termination at the terminal tabs.

17 Claims, 5 Drawing Sheets

SYSTEM FOR BATTERY FORMATION, CHARGING, DISCHARGING, AND EQUALIZATION

This application claims the benefit of U.S. Provisional Application No. 60/120,635, filed Feb. 17, 1999.

FIELD OF THE INVENTION

The present invention relates generally to the field of lithium batteries, and more particularly, to a system for the formation, charging, discharging, and equalization of lithium batteries.

BACKGROUND OF THE INVENTION

Rechargeable, secondary batteries such as lithium-polymer batteries, show great promise in providing power sources for a variety of applications such as portable electronic devices. Such batteries may be formed as a thin, somewhat rectangular form factor with large available power density. Once the battery is formed, it is then subjected to a formation or charging process.

Battery formation is the process in which secondary cells are energized to effectuate their capability to deliver electrical energy. Secondary cells and batteries are assembled with electronically inert chemical compounds. In order to energize the devices by converting the inert substances into electroactive species and to prepare them for service, one must provide an initial, slow charge called formation or forming. This process is normally executed in a two-phase process. First, a constant current is applied to the cell or battery up to a predetermined voltage limit. At that point, the voltage applied to the battery terminals is maintained at a constant value and the current trails off to a low value. Formation can then be terminated based upon a total number of ampere-hours input into the cell or group of cells or a current limit as the charging current decreases with the internal resistance of the cell.

While this procedure is implemented routinely for a wide range of battery chemistries, there are a number of associated shortcomings, particularly with cells based upon lithium chemistry. The first shortcoming relates to the overall system for connecting the cells to the charge apparatus for the formation process. Commonly, the cells being formed or charged are connected in series to one another as part of a single regulated circuit. In this configuration there can be no provision for treating a potentially weak cell without affecting, perhaps adversely, other cells in the circuit. Moreover, for large batches of cells, such as more than 100 cells or batteries, the voltage requirements may become extreme, and the power supply specifications prohibitively expensive and dangerous.

The second shortcoming of the standard formation process and instrumentation is the means of electrically and mechanically coupling a battery or cell to the formation circuit. Most lithium cells, especially lithium-polymer cells, are manufactured in custom form factors without standardized, rigidly defined dimensions, particularly in length and width. Also, the electrical contacts or terminals of the cells are generally flexible metallic foil tabs which are difficult to localize. That means that interfacing these cells with the formation circuit poses a particular challenge. Clamps can be used, but labor becomes intensive as the number of cells to be formed increases for a particular batch of cells. Connection through probes oriented normal to the plane of the terminal tabs is less laborious, but stabilizing the flexible strips becomes critical.

Thus, there remains a need for a lithium battery formation system in which large batches of cells or batteries may be formed and charged safely and effectively and in which the cells in the batch are more uniformly charged in the process. There is a further need for a system for safely and effectively connecting lithium batteries into the formation and charging system. The system should make the coupling of the cells into the system easy and thus eliminate the difficulties in the art of interfacing the cells, should makes registration of the cells in the system easy to accomplish, and should eliminate the need to stabilize the flexible strips of the battery cells.

SUMMARY OF THE INVENTION

The present invention addresses these and other shortcomings in the art with an improved system for the formation of secondary batteries, such as lithium ion and lithium-polymer cells. The first aspect of the present invention provides for equalization of each of a number of the aforementioned cells connected in series. Each independent circuit supplements the bulk formation charge of 1 to 5 Amperes with a small equalization current ($\mu$A to mA) to normalize the terminal Voltage and, hence, the conditions of all cells. No complex external circuitry is required, as a small power supply for each cell position will suffice. The control circuit is simplified further by the generation of a single Voltage profile applied only to the first cell in the string or to the whole string. The term "voltage profile" refers to the voltage as viewed over time. This new method of control is called "polarization control" and eliminates the need for a separate current regulator for each cell and is universal for cells of any size of a specific chemistry. The profile is simply repeated for every cell in the series and ensures that every position is voltage-equalized. Furthermore, as the embodiment of the equalizer connected to each cell is a bipolar potentiostat, the benefit can be realized during discharge as well as charging processes.

In a second aspect of the present invention, the embodiment is extended to include a parallel aggregate of cells connected in series, and this arrangement eliminates the need for current regulation for each cell. Each parallel-grouped cell is equipped with a current-limiting device that protects the entire system against excessive current drains from a particularly weak cell. This arrangement, referred to herein as constant average current, provides a mechanism for self-equalization of the cells configured in this way.

As in the embodiment consisting of purely series-arranged cells, in this system cells in parallel are governed by the same voltage profile, and each cell draws current from a Voltage-regulating power supply according to its state of health. In some cases, cells will even be discharging slight currents to the bipolar power supply. However, since the power supply is a bipolar potentiostat, only one assemblage of electrical connections is needed for each cell. For large populations of cells the net equalization current is zero.

By means of extension of the concepts enumerated above, one can envision the embodiment of the innovation as a charging instrument. Cells may be charged optimally individually or in strings, as described above. The same equalizer circuitry and polarization control methodology as with the formation system may be applied.

In yet another aspect of this invention, a means is provided for connecting cells to the electronic instrument containing the voltage-regulating power supply. While most formation systems require large trays with imbedded circuitry for interfacing with the test/inspection instrument, the present invention provides a cell holder capable of providing safe, secure electrical connection of individual flat lithium ion and lithium-polymer cells directly to the formation channels without cables or unwieldy trays and pallets. Further, these special holders provide for reliable termination at the terminal tabs.

These and other features of this invention will be apparent to those skilled in the art from a review of the detailed description along with the accompanying drawings.

BRIEF DESCRIPTION OF THE DRAWINGS

The drawing figures illustrate typical embodiments of this invention and are therefore not limiting of its scope, for the invention may admit to other equally effective embodiments.

DETAILED DESCRIPTION OF A PREFERRED EMBODIMENT

Figure 1:
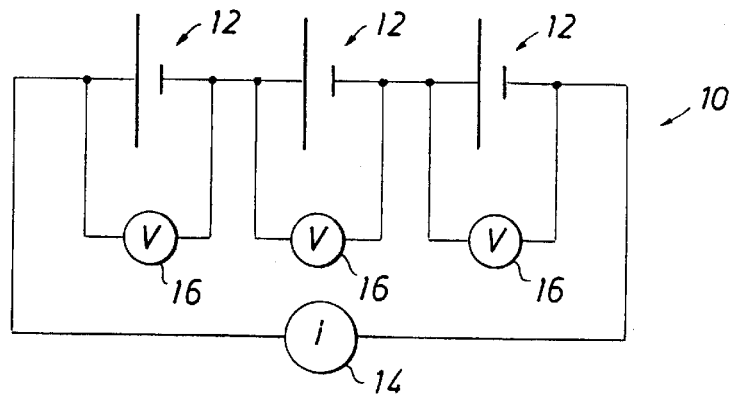
FIG. 1 is a schematic diagram of a typical prior art formation circuit for secondary batteries.

FIG. 1 shows a typical arrangement 10 for the formation of secondary cells. The arrangement includes a plurality of cells 12, of which three such cells are depicted, although many such cells may be coupled into the system 10. The cells 12, are coupled in series with a regulated current source 14, and each cell is provided with a voltage sensor 16, to monitor the progress of the formation process. Since the cells 12 are in series, the current through all of the cells is the same, regardless of the specific characteristics of the cells. Thus, no accounting is made for the strength or weakness of an individual cell, and the weakest cell in the arrangement of FIG. 1 drives the formation process.

Figure 2:
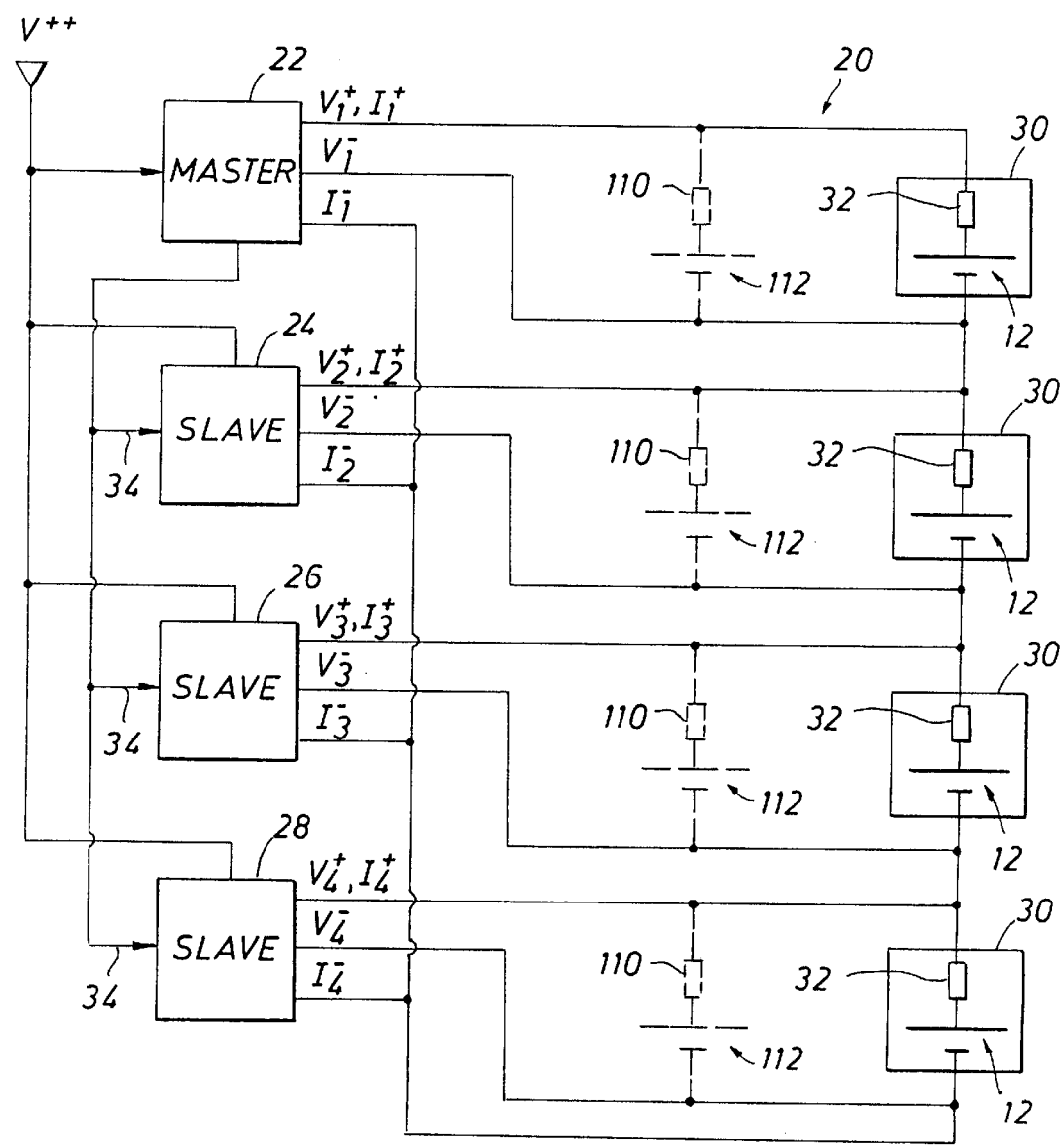
FIG. 2 is a schematic diagram of a formation circuit assembly of the present invention, showing how several cells in the formation system are connected to the regulation circuitry.

To eliminate this problem, the present invention couples the cells for the formation process in parallel, as shown in FIG. 2. A circuit assembly comprising a forming system 20 of this invention includes a master power supply or channel 22, and a plurality of slave power supplies or channels 24, 26, and 28. Each of the power supplies represents a single channel of a multi-channel voltage, current controllable electronic test instrument. The master channel also includes a bipolar, output voltage-adjustable voltage regulator as an equalizer, illustrated below in respect of FIG. 3. All channels are connected to the master voltage-regulated current power supply 22. The master channel 22 develops a regulated voltage, represented in FIG. 2 as $V_1+$ and $V_1-$, a regulated current, represented as $I_1+$ and $I_1-$. The slave power supplies develop regulated voltages and currents, and are represented with a similar convention.

Each channel is coupled to a cell 12, and each cell 12 is mounted in a fixture 30, described below in greater detail in respect of FIGS. 5 and 6. Each cell is further provided with over-current protection, such as for example with a fuse 32.

The parallel equalization provided by the formation circuit 20 of FIG. 2 involves referencing the voltage output, i.e., the difference between $V_1+$ and $V_1-$, from the master channel 22, to an input 34 of the slave power supplies 24, 26, and 28. As the master channel 22 exercises either voltage or current control over its associated cell, each cell coupled to a slave channel will be maintained at the same voltage potential as the cell coupled to the master channel. In order to maintain the many channels at the same potential, small equalizing currents, complementary to the master control current or voltage and independent of the action upon any other cell, will be drawn passively from the power supply associated with that particular cell.

Figure 3:
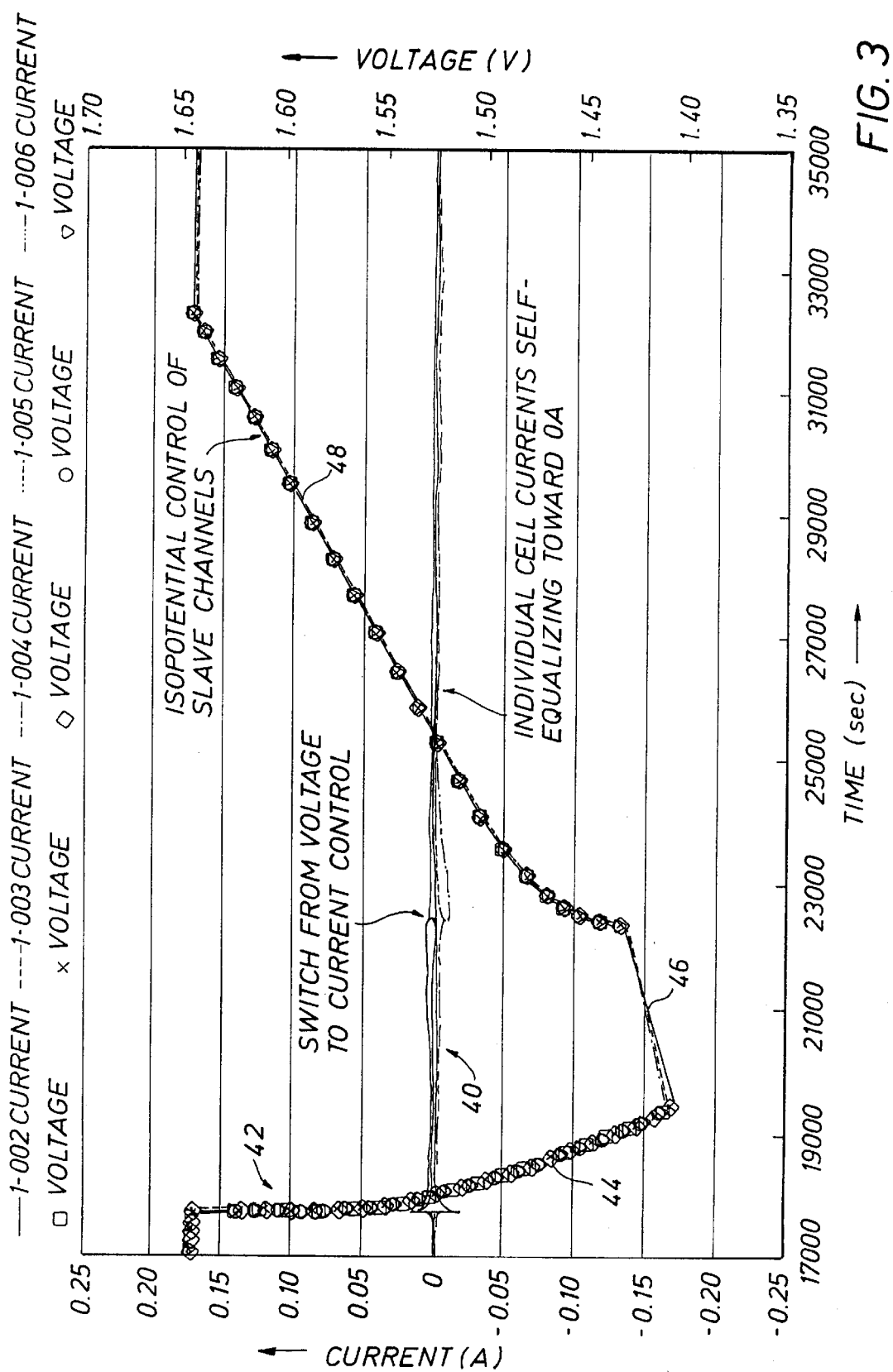
FIG. 3 is a sample data trace obtained by implementation of the present invention, exhibiting the capability of balancing and equalizing cells in series.

FIG. 3 shows a limited-scale example where five individual slave power supplies, with currents numbered 1-002 through 1-006 in FIG. 3, of a formation circuit 20 are governed by a simple voltage profile dictated by a master channel 22. Shown on a primary axis 40 are the currents flowing through each individual cells from the power supply. The asymptotic approach toward zero amps indicates that the conditions of the cells are balancing with one another as the formation of the plurality of cells progresses. Superimposed on the plot of the individual equalizing currents of the cells is a plot 42 of the voltages across the cells. The voltage, seen on the ordinate at the right, begins at about 1.65 volts, and initially drops rapidly to about 1.4 volts in about 1000 seconds over a segment 44 of the plot. Then, over a segment 46, voltage rises approximately linearly to about 1.43 volts. At that point, the control circuitry (not shown) in the master channel switches to a constant current control mode over a final segment 48 of the formation process. Thus, the individual cells are equally charged, regardless of the individual makeup of the cells (within tolerances).

Figure 4:
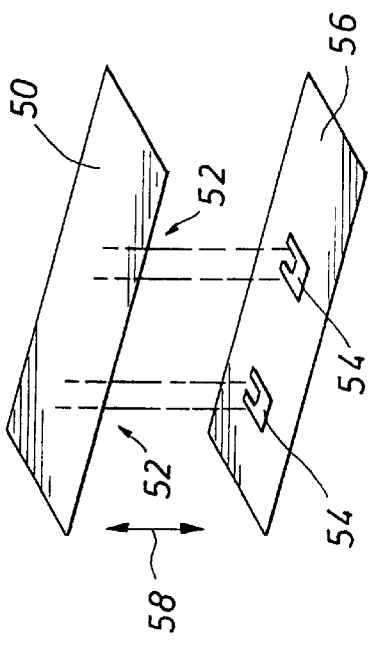
FIG. 4 is a perspective view of a known structure for the formation of secondary cells using probes.

The invention as so far described may use any of the known prior art techniques for coupling the cells 12 to the power supplies, as shown in FIG. 4. In such a known system, a power supply board 50 includes all of the formation circuitry electrically coupled to a plurality of probes 52. A plurality of individual cells 54 are placed on a support board 56. The power supply board 50 and the support board 56 are then brought together, as indicated by an arrow 58. The probes 52 then contact the electrodes of the cells 54, one probe for the anode and one probe for the cathode, and formation process begins. As shown in FIG. 4, the registration between the probes can be difficult, and since the probes are rigidly mounted to the board, a power supply board is adapted for the formation of a single size of cell.

Figure 5:
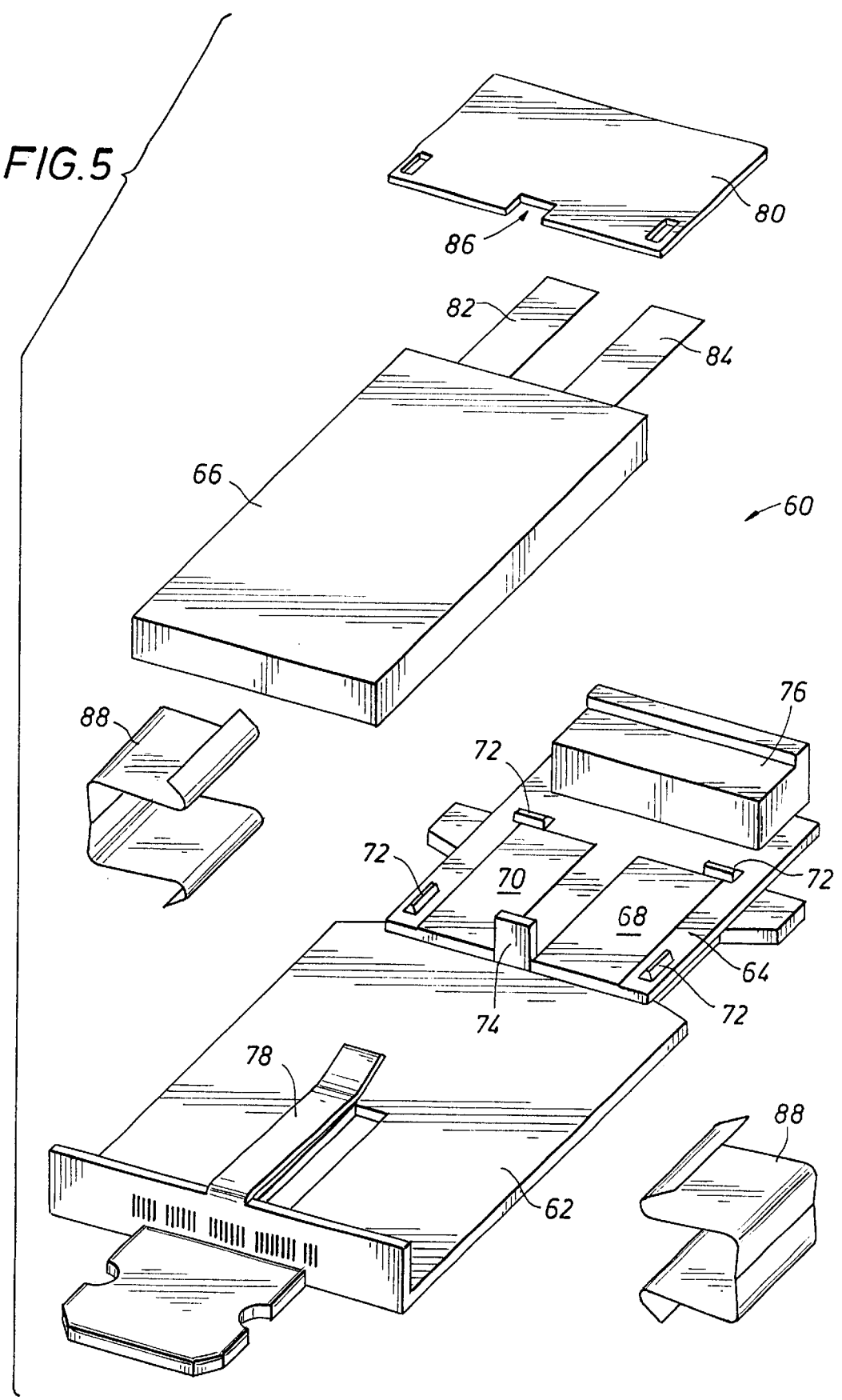
FIG. 5 is a partially exploded perspective view of a cell holder of this invention.
Figure 6:
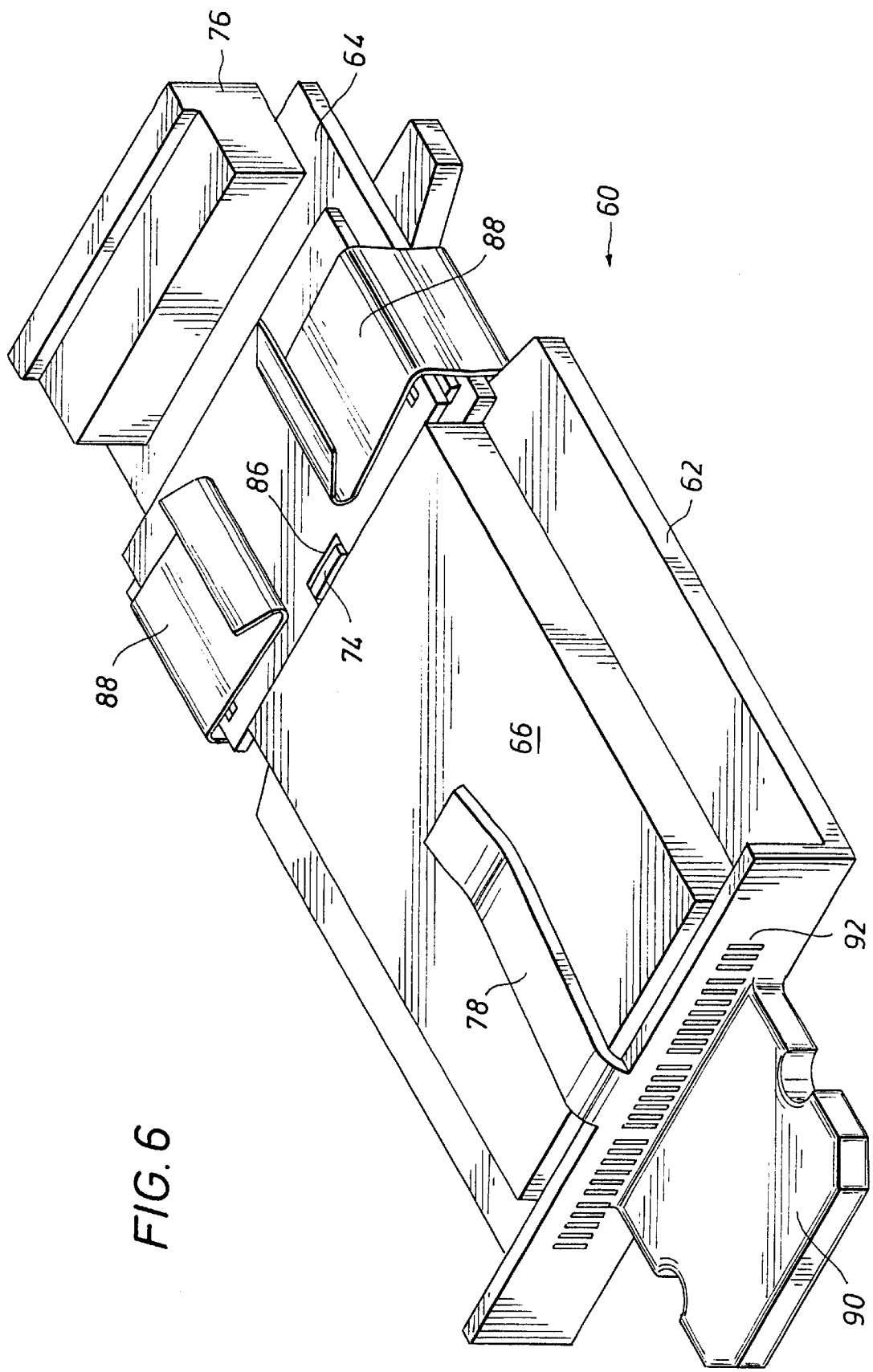
FIG. 6 is an assembled perspective view of the cell holder of FIG. 5.

FIGS. 5 and 6 depict a universal cell holder 60 of this invention, which is particularly useful in the formation system previously described in respect of FIG. 2. The cell holder is particularly useful in the formation individual flat lithium-polymer cells, but is also useful in the formation of other secondary cells. The cell holder is used in the formation process instead of a multi-cell tray that is commonly used in the art. Alternatively, a plurality of such cell holders may be used on a tray, rather than placing a plurality of bare cells on the tray, as is now commonly done in the art.

The holder 60 includes several pieces that facilitate alignment of or electrical contact to a cell. The holder includes a base 62, preferably of molded plastic, on which the other components are mounted, such as a printed circuit board 64, which includes electrical contacts to provide power to a cell 66. A contact 68 is provided for an anode, and a contact 70 is provided for a cathode, although these designation can be reversed. The printed circuit board 64 is preferably secured to the base 62 by registration tabs 72, which are also molded as part of the base. Also molded as part of the base is an alignment post 74 to help align the cell 66 with the holder.

At one end of the board 64 is mounted a Phoenix connector 76 to couple power to the board 64. The Phoenix connector serves as a cell interface block with the capability for outfitting with a variety of connectors. At the other end of the structure opposite the connector 76 is a spring clip 78, molded as part of the base, which retains the cell 66. A cover plate 80 is adapted to fit over tabs 82 and 84 of the cell 66 when the cell is mounted into the holder, the cover plate 80 includes a registration opening 86 which aligns with the alignment post 74. The protective cover is preferably secured to the board 64 over the tabs 82 and 84 with a set of retaining clips 88. Extending from the base 62 is a manipulation handle 90, which is also useful in mounting the holder 60 to other structure if desired. Finally, the base 62 may include a bar code 92 for tracking an individual cell.

An advantage of the holder 60 of this invention is that it can hold a small cell, or a large cell, or any size cell in between. So long at the tabs 82 and 84 can fit around the alignment post, and thus contact the contacts 68 and 70, the present invention can then be used in the formation process for the cell. As previously described and shown in FIG. 2, each cell is provided with a regulated voltage and a regulated current. While this is shown schematically in FIG. 2 as a single conductor, in reality separate conductors are required for the voltage supply and the current supply.

Figure 7:
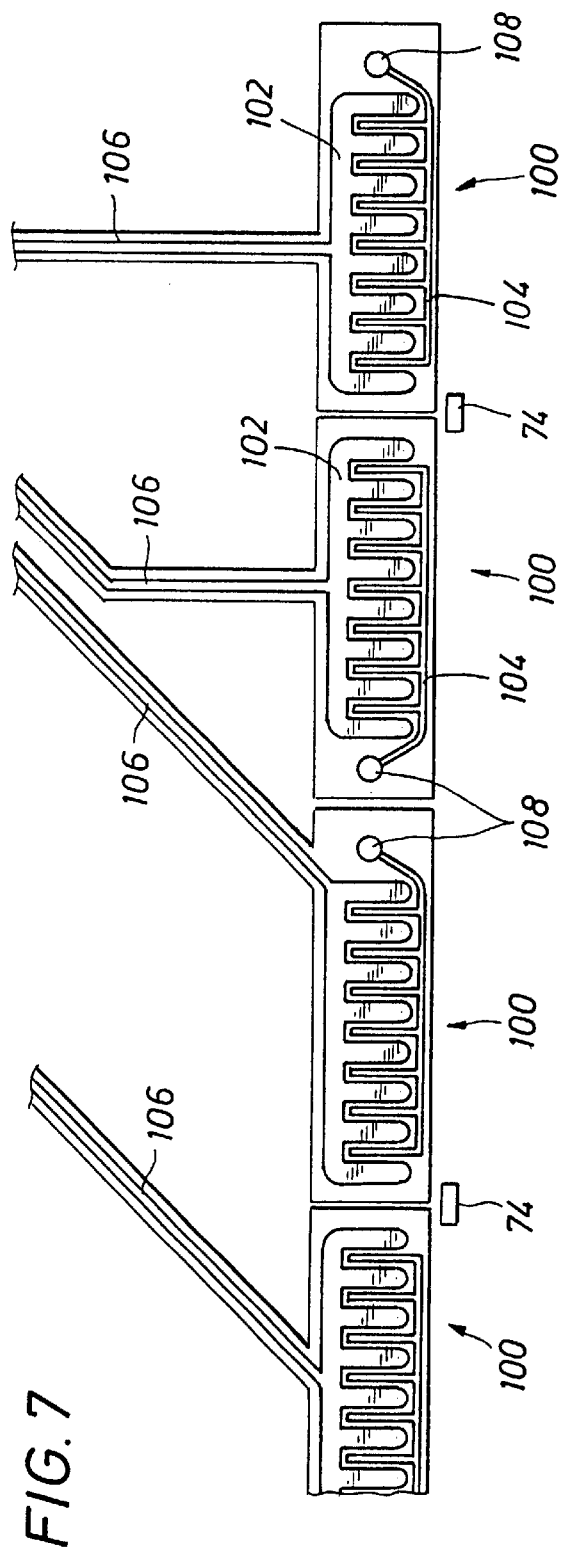
FIG. 7 is a plan view of a pair of contacts which find application in the cell holder.

This is accomplished by an interdigitated contact 100 shown in FIG. 7. For simplicity, only two pairs of such contacts are shown in FIG. 7, but many of such contacts may be used. The contacts 100 are situated on either side of an alignment post 74. Each contact 100 includes a current contact 102, and a voltage contact 104. The current contact is supplied by a current conductor 106, and the voltage contact 104 is supplied from a via 108, which contacts a voltage conductor on the underside of the board shown in FIG. 7.

Returning again to FIG. 2, the present invention is also adaptable to the formation of more cells in parallel, with a parallel arrangement of cells coupled to one power supply. As shown in FIG. 2, a plurality of cells 112 (shown in phantom) may be connected across the some supply conducts as the cells 12, and each is provided with over-current protection 110.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A circuit assembly for use in the formation of secondary cells comprising:
    a. a master channel defining master voltage leads and master current leads;
    b. means for coupling a first cell to the master channel across the master voltage leads in order to charge the first cell;
    c. a slave channel defining slave voltage leads and slave current leads;
    d. means for coupling a second cell to the slave channel across the slave voltage leads in order to charge the second cell; and
    e. a control line from the master channel to the slave channel to control the output characteristics of the slave channel in order to charge the second cell equally with the first cell.

2. The circuit assembly of claim 1, further comprising means for coupling a third cell in parallel with the first cell.

3. The circuit assembly of claim 2, wherein the master channel includes a bipolar, output voltage-adjustable voltage regulator as an equalizer.

4. The circuit assembly of claim 1, wherein the master channel forms a plurality of secondary cells with a single voltage profile.

5. The circuit assembly of claim 1, wherein the assembly is adapted for charging rechargeable devices.

6. The circuit assembly of claim 2, further comprising means for coupling a plurality of cells in series or a parallel-series arrangement.

7. The circuit assembly of claim 1, wherein the assembly is adapted to recharge cells after use.

8. The circuit assembly for claim 1, further comprising a current limiter to provide over-current protection to the first cell.

9. The circuit assembly of claim 1, wherein the means for coupling a first cell comprises an individual flat cell holder.

10. The circuit assembly of claim 9, wherein the holder comprises:
    a. an electrical contact for each of the anode and cathode of the first cell; and
    b. a base on which the electrical contact for each of the anode and cathode is mounted.

11. The circuit assembly of claim 10, wherein the electrical contact includes electrical continuity to both the master voltage leads and master current leads.

12. The circuit assembly of claim 11, further comprising a protective cover adapted to be mounted to the base over the anode and cathode of the first cell.

13. The circuit assembly of claim 11, wherein the base is adapted to receive a range of sizes of cells.

14. The circuit assembly of claim 11, further comprising a cell interface block electrically coupled to the contact, the block having the capability for outfitting with a variety of connectors to connect the master channel to the holder.

15. The assembly of claim 1, adapted to be used in lithium polymer cell or flat cell formation.

16. A method of forming a plurality of secondary cells, comprising the steps of:
    a. coupling a first secondary cell to a master channel in order to charge the first secondary cell;
    b. coupling a second secondary cell to a slave channel in order to charge the second secondary cell;
    c. providing power to the first and second secondary cells from the master and slave power supplies, respectively;
    d. wherein the voltage of the slave channel in controlled by the master channel to charge the second secondary cell equally with the first secondary cell.

17. The method of claim 16, further comprising the step of mounting the first secondary cell in a holder.

* * * * *